(12) United States Patent
Hietala et al.

(10) Patent No.: US 9,777,345 B2
(45) Date of Patent: Oct. 3, 2017

(54) METHOD AND APPARATUS FOR ACID GRANULATION OF MATTE

(71) Applicant: OUTOTEC (FINLAND) OY, Espoo (FI)

(72) Inventors: Kari Hietala, Espoo (FI); Tiina Ranki, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 185 days.

(21) Appl. No.: 14/650,659

(22) PCT Filed: Dec. 19, 2013

(86) PCT No.: PCT/FI2013/051181
§ 371 (c)(1),
(2) Date: Jun. 9, 2015

(87) PCT Pub. No.: WO2014/096545
PCT Pub. Date: Jun. 26, 2014

(65) Prior Publication Data
US 2015/0307955 A1 Oct. 29, 2015

(30) Foreign Application Priority Data

Dec. 20, 2012 (FI) ..................... 20126345

(51) Int. Cl.
*C22B 3/06* (2006.01)
*C22B 7/00* (2006.01)
(Continued)

(52) U.S. Cl.
CPC *C22B 1/24* (2013.01); *B01J 2/02* (2013.01); *C03B 19/10* (2013.01); *C22B 3/06* (2013.01);
(Continued)

(58) Field of Classification Search
CPC ... B01J 2/02; C03B 19/10; C22B 3/06; C22B 7/007
See application file for complete search history.

(56) References Cited

U.S. PATENT DOCUMENTS 3,085,054 A  4/1963 Thornhill
3,773,494 A  11/1973 Tuwiner
(Continued)

FOREIGN PATENT DOCUMENTS

CN   1259108 A    7/2000
CN   202415574 U  *  9/2012
(Continued)

OTHER PUBLICATIONS

CN 202415574 U published Sep. 2012. Machine translation.*
(Continued)

*Primary Examiner* — George Wyszomierski
*Assistant Examiner* — Tima M McGuthry Banks
(74) *Attorney, Agent, or Firm* — Buchanan, Ingersoll & Rooney PC

(57) ABSTRACT

A method is provided for leaching the metals while granulating molten matte, comprising the steps of feeding a molten matte as a falling stream into a granulation chamber, spraying a liquid jet on the stream of molten matte to atomize the matte, and cooling the matte particles thus formed. The liquid jet comprises an acid solution containing water and sulfuric acid so that the acid solution starts leaching metals from the molten matte when the liquid jet contacts the molten matte. Part of product solution from granulation can be circulated to liquid jets to increase the metal content in the solution and to reduce its acid con-tent.

17 Claims, 2 Drawing Sheets

(51) Int. Cl.
*C03B 19/10* (2006.01)
*C22B 1/24* (2006.01)
*B01J 2/02* (2006.01)
*C22B 23/02* (2006.01)
*C22B 3/00* (2006.01)
*C22B 15/00* (2006.01)
*C25C 1/06* (2006.01)
*C25C 1/08* (2006.01)
*C25C 1/12* (2006.01)
*C25C 1/20* (2006.01)

(52) U.S. Cl.
CPC .......... *C22B 7/007* (2013.01); *C22B 15/0067* (2013.01); *C22B 23/025* (2013.01); *C22B 23/043* (2013.01); *C22B 23/0415* (2013.01); *C25C 1/06* (2013.01); *C25C 1/08* (2013.01); *C25C 1/12* (2013.01); *C25C 1/20* (2013.01)

(56) References Cited

U.S. PATENT DOCUMENTS

| | | | |
|---|---|---|---|
| 3,880,653 | A | 4/1975 | Hougen |
| 3,938,975 | A * | 2/1976 | Nagata ...................... C21B 3/08 65/19 |
| 3,975,189 | A | 8/1976 | Haugen |
| 4,108,639 | A | 8/1978 | Lake et al. |
| 4,671,752 | A | 6/1987 | Nakahara et al. |
| 6,000,242 | A * | 12/1999 | George ............... C03B 19/1045 241/15 |
| 6,569,224 | B2 | 5/2003 | Kerfoot et al. |
| 7,857,887 | B2 | 12/2010 | Zhou et al. |

FOREIGN PATENT DOCUMENTS

| | | |
|---|---|---|
| EP | 1 666 614 A2 | 6/2006 |
| WO | WO 98/54103 A1 | 12/1998 |

OTHER PUBLICATIONS

English language Translation of PCT/RU2004/000283, published as WO 2005/007898 A3 on Jan. 2005.*
ESPACENET family list for EP 1666614 A2, published Jun. 2006. Includes WO 2005/007898 A3.*
International Search Report (PCT/ISA/210) mailed on Apr. 7, 2014, by the Finnish Patent Office as the International Searching Authority for International Application No. PCT/FI2013/051181.
International Preliminary Report on Patentability (PCT/IPEA/409) mailed on Dec. 16, 2014, by the Finnish Patent Office as the International Preliminary Examining Authority for International Application No. PCT/FI2013/051181.
Office Action issued by the Chinese Patent Office in corresponding Chinese Patent Application No. 201380066336.1 on Jun. 27, 2016 (5 pages).

* cited by examiner

METHOD AND APPARATUS FOR ACID GRANULATION OF MATTE

FIELD OF THE INVENTION

The present invention relates to a method for granulating molten matte, comprising the steps of feeding a molten matte as a falling stream into a granulation chamber, spraying a liquid jet on the stream of molten matte to atomize the matte, and cooling the matte particles thus formed.

The invention also relates to an apparatus for granulating molten matte, comprising a granulation chamber, means for feeding a stream of molten matte into the granulation chamber, and at least one atomizing nozzle for spraying a liquid jet on the stream of molten matte to atomize the matte.

BACKGROUND OF THE INVENTION

Traditionally, nickel and copper ore concentrates are processed in separate smelting processes. Nickel and copper mattes are produced from these concentrates by means of, for instance, a flash smelting process. After smelting, the recovery of each metal from the matte produced is carried out by hydrometallurgical processes based on the prerequisites of the metal in question.

A matte resulting from a pyrometallurgical process needs to be disintegrated in one way or another before it is subjected to hydrometallurgical processing. It is a common practice to granulate molten matte by jetting pressurized medium, which may be, for instance, air or water, against a stream of molten matte falling from a launder. U.S. Pat. No. 4,671,752 A discloses an apparatus for air-pulverizing high-temperature molten slag. U.S. Pat. No. 6,000,242 A discloses an apparatus and a method for granulating molten material by means of water, which is pH controlled to neutral or slightly basic. U.S. Pat. No. 7,857,887 B2 discloses a matte granulation method in which gas is sprayed on a molten matte flowing out from a chute so that the gas jet disperses the molten matte into tiny liquid drops. The gas also cools the liquid drops to semi-molten or solid matte grains. The matte grains are quenched by pressurized cold water. The gas is pressurized and inert with the molten matte. The gas can be saturated steam or compressed air with a gas pressure of 0.2-3.0 MPa.

U.S. Pat. No. 3,880,653 A and U.S. Pat. No. 6,569,224 B2 teach subjecting nickel and copper containing matte or concentrate to chlorine leach. It is also known from the prior art to use pressure leach in a sulfate environment. Nickel is reduced to metal by nickel electrolysis on nickel cathodes. Electrolytic deposition of nickel from a purified solution can be carried out by chloride electrolysis, as taught in U.S. Pat. No. 3,085,054 A, U.S. Pat. No. 3,880,653 A and U.S. Pat. No. 3,975,189 A, or by sulfate electrolysis. Metallic nickel can also be produced by hydrogen reduction in autoclaves. Copper is extracted and electrowon on copper cathodes.

The above mentioned patents aim at leaching of copper-nickel matte in a chloride environment, purification of the solution by precipitation/extraction and, finally, electrolytic deposition of nickel on cathode. The methods of the prior art also produce ferrous leach residue, which is removed from the process by dumping. The process of U.S. Pat. No. 6,569,224 B2 is directed to treatment of concentrate. In that case, precious metals are bound to sulfur and its compounds, which leads to losses of precious metals.

Today, granulation of matte and leaching of metals from matte are carried out in separate process steps. Granulation is usually carried out with a slightly alkaline liquid and leaching is carried out as a combined atmospheric and pressure leaching. The inventors have realized that there is a need for a new process that combines these two process steps.

PURPOSE OF THE INVENTION

The purpose of the present invention is to combine granulation and leaching operations to provide an improved process for recovery of valuable metals from a metal matte so that the main part of metals can be leached from the matte already during the granulation step.

SUMMARY

The method according to the present invention is characterized by what is presented in claim 1.

The apparatus according to the present invention is characterized by what is presented in claim 16.

The process according to the present invention comprises direct acid granulation of molten matte and a process flow sheet that is different from previous process flow sheets. Molten matte is fed as a falling stream into a granulation chamber, where liquid jets are sprayed on the stream of molten matte to atomize it. The liquid jet comprises an acid solution containing water and sulfuric acid. The acid solution starts leaching metals from the matte when the liquid jet contacts the molten matte. The acid solution reacts at a high temperature with metals of the matte, leaching for instance nickel into a nickel sulfate solution. Thanks to the high temperature in acid granulation, time is not sufficient for nickel passivation. The combined granulation and leaching step yields a product solution containing metal sulfates and residual sulfuric acid and a leaching residue in the form of atomized matte particles.

In addition to one or more liquid jets, also one or more jets of gas or steam can be blown against the falling stream of molten matte. The effect of a gas or steam jet can be further intensified by introducing solid particles into said gas or steam flow.

Reaction zone in the granulation chamber having a temperature suitable for leaching reactions can be extended by circulating hot gases from an upper part of the granulation chamber to a lower part of the same.

Matte particles can be cooled and leached at the bottom of the granulation chamber by spraying liquid jets of cooled acid solution on the matte particles.

The process can be carried out as dry granulation. In that case, the acid solution can contain 5-50 g/l free sulfuric acid and 0-20 g/l metal sulfates, and the mass flow of the liquid jet in relation to the mass flow of the molten matte is adjusted so that the final product settling at the bottom of the granulation chamber is essentially free of liquid.

Alternatively, the process can be carried out as wet granulation. In that case, the acid solution can contain 5-15 g/l free sulfuric acid and 0-20 g/l metal sulfates. The acid solution collected from the bottom of the granulation chamber is rich in metal sulfates and this solution is called product solution. The matte particles formed during granulation are separated from the product solution in or after the granulation chamber.

Part of the product solution can be circulated back to the liquid jets, possibly together with fresh acid and other possible added ingredients, and part of the product solution is supplied to further treatment needed for the recovery of metals from the product solution.

The matte particles, or leaching residue, formed during acid granulation are passed to further steps of metal recovery, which may comprise purification of the solids and recovery of metals by chloride leaching. Leaching of precious metals from the leach residue of sulfuric acid leaching can be carried out in a separate chloride leach circuit, where the amount of solution needed is relatively small.

The molten matte can be, for instance, nickeliferous matte, which also contains at least one metal of a group containing copper, cobalt, platinum group metals, gold and silver.

Off-gases generated during granulation and leaching can be conveyed to a gas scrubber, and the acid recovered by the gas scrubber can be returned to the process.

Hydrometallurgical iron slag from the granulation process can be supplied back to the smelter, where it is converted to solid smelter slag, and the precious metals remaining in the iron slag can be recovered.

An apparatus for granulating molten matte comprises a granulation chamber, means for feeding a stream of molten matte into the granulation chamber, and at least one atomizing nozzle for spraying a liquid jet on the stream of molten matte to atomize the matte. The liquid jet comprises an acid solution containing water and sulfuric acid so that the acid solution is able to start leaching metals from the matte when the liquid jet contacts the molten matte.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

The description below discloses embodiments of the present invention in such a detail that a person skilled in the art is able to utilize the invention based on the disclosure. Not all steps of the embodiments are discussed in detail, as many of the steps will be obvious for the person skilled in the art based on this specification.

Figure 1:
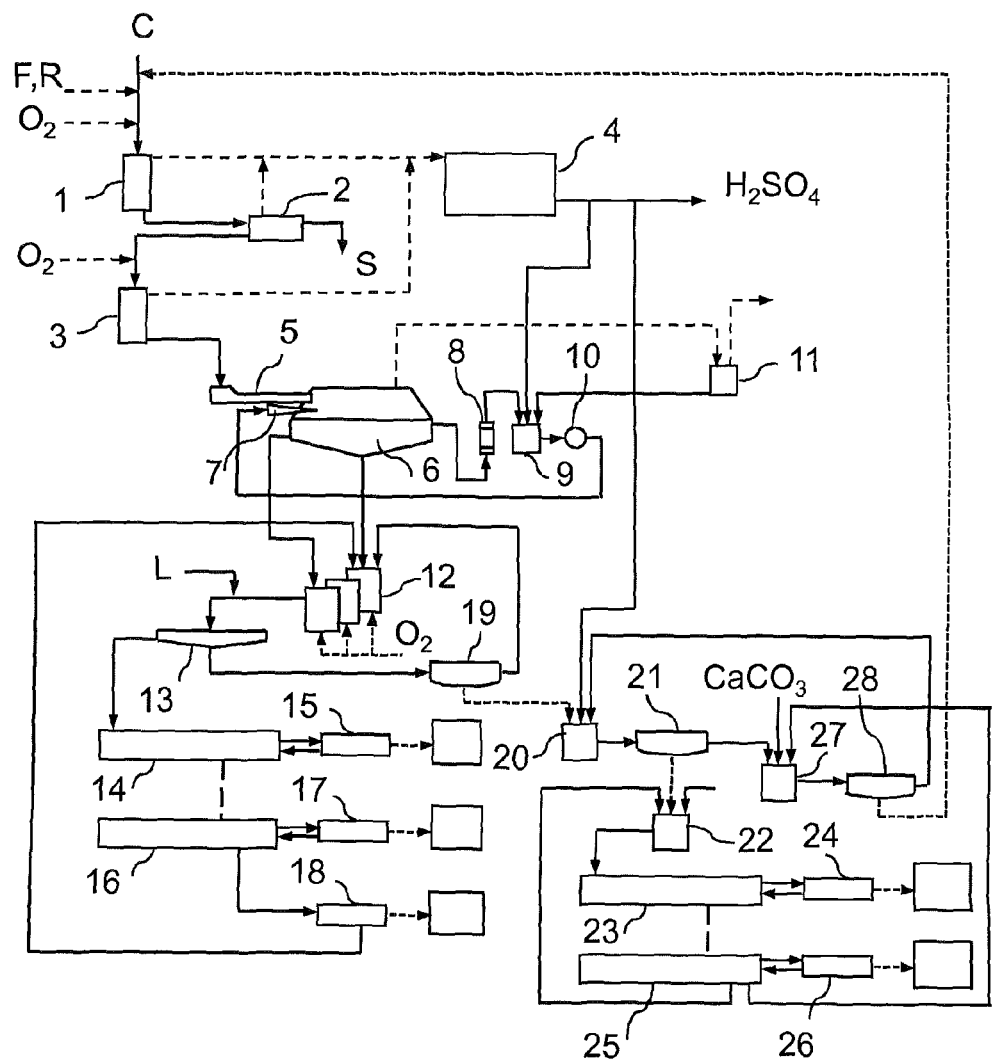
FIG. 1 is a flow sheet of a process according to the present invention.

FIG. 1 shows an example of a flow sheet of a metals recovery process employing the present invention. The process is a heterometallurgical assembly of pyrometallurgical process steps and hydrometallurgical process steps.

The process comprises a primary smelter 1 for processing a mixed concentrate C, which can be, for instance, nickeliferous concentrate containing copper, cobalt and precious metals. The smelter 1 may be, for instance, an Aussmelt furnace. In addition to the ore concentrate C, flux F, reagents R and oxygen-containing gas are supplied into the primary smelter 1. Once in the smelter 1, oxygen combusts the concentrate to give molten matte, molten slag and $SO_2$-bearing off-gas. The molten matte and slag are tapped from the smelter 1 and transferred to an electric furnace 2 for slag cleaning. The slag S from the electric furnace 2 is granulated and dumped, whereas the liquid matte is tapped and transferred to a secondary smelter 3. Oxygen-containing gas is also supplied to the second smelter 3, which can be, for instance, a TROF converter (tilting and rotating oxygen-fed furnace) or an Aussmelt furnace. $SO_2$-containing off-gases from the primary smelter 1, electric furnace 2 and secondary smelter 3 are conveyed to a sulfuric acid plant 4 to be used for production of sulfuric acid.

Molten matte is tapped from the secondary smelter 3 and supplied via a launder 5 to a granulation chamber 6. The matte falling down from the launder 5 is atomized by directing a jet of sulfuric acid solution, sprayed by at least one atomizing nozzle 7, against the freely falling stream of molten matte. In addition to atomizing the matte, the hot sulfuric acid jet also starts leaching metals from the matte. The atomized matte particles are quenched in the acidic solution bath in the bottom of the granulation chamber 6.

Overflow from the granulation chamber 6 is conveyed to acid solution preparation steps, which may comprise a filter 8, a mixer 9 and a high-pressure pump 10. Sulfuric acid from the sulfuric acid plant 4 and washing liquid from a gas scrubber 11, which is arranged to wash the off-gases discharged from the granulation chamber 6, can be supplied to the mixer 9 to adjust the properties of the acid solution. The acid solution can be pressurized to a pressure higher than 10 MPa by the high-pressure pump 10 before the acid solution is sprayed into the molten matte in the the granulation chamber 6.

Insoluble leaching residue and underflow from the granulation chamber 6 are passed to a leach system consisting of a plurality of leach tanks 12, where metallic components of the mixed matte, for instance, Cu, Co, Ni, are leached in the presence of sulfuric acid. Oxygen-containing gas is added to the leach tanks 12. From the last leach tank 12 a material flow consisting of insoluble precious metals and dissolved metal sulfates in an acid solution is conveyed to a flotation concentrator 13. Flocculating agent L is added to the material flow before the concentrator 13 to accomplish the separation of insoluble precious metals from dissolved metal sulfates.

Concentrate from the concentrator 13 is conveyed to first solution purification 14, which is followed by first metal electrowinning 15, and to second solution purification 16, which is followed by second metal electrowinning 17 and third metal electrowinning 18. Solution from the last electrowinning step 18 is circulated to the first leach tank 12 of the leach system. Metals recovered by solution purification and metal electrowinning may comprise, for instance, copper, cobalt and nickel.

Solids from the flotation concentrator 13 are supplied to a filter press 19, from which filtrate is returned to the first leach tank 12 whereas solids are fed to an iron dissolution tank 20. In the iron dissolution tank 20 the iron compounds of the leach residue are dissolved in the presence of sulfuric acid supplied from the sulfuric acid plant 4, while precious metals remain insoluble. After separating insoluble fraction from the iron sulfate containing filtrate in a second filter press 21, the insoluble fraction is fed to a mixer 22, where concentrated HCl and $H_2O_2$ oxidizer are mixed with the solids to leach precious metals into the solution. The chloride leach solution can also contain bromides for forming gold chloro complexes. The chloride leach solution is fed to third solution purification 23, which can be gold solvent extraction followed by fourth electrowinning 24, and to fourth solution purification 25, which is followed by fifth electrowinning 26. The precious metals recovered in process steps 23-25 may comprise, for instance, gold, palladium, and platinum. The solvent extraction steps are carried out using known extractants.

Filtrate from the second filter press 21 is fed to a mixing tank 27, where $CaCO_3$ is added to precipitate iron sulfate, after which the precipitate can be circulated to the primary smelter 1. Filtrate is returned to the iron dissolution tank 20.

The new method comprises acid granulation, or atomization, of molten nickel matte or mixed matte by jetting sulfuric acid containing solution downstream into a stream of molten matte. During this atomization step, a jet of concentrated sulfuric acid collides with the stream of molten matte and the matte splinters forming solid particles, which are collected to a collector basin. When the acid solution jet collides with the matte, the acid reacts immediately with the melt and leaches metal sulfates from the drop-forming melt. Consequently, the process step combines the atomization of the matte and the leaching of metals from the matte. As the acid solution meets hot melt, part of water and acid contained in the jet evaporates and vaporizes. The evaporated steam or vapor is collected and conveyed to a gas scrubber 11 for acid recovery. Recovered acid is recycled back to the process and clean gas is released to the atmosphere.

During the granulation step matte partly atomizes into very small particles of a size smaller than 100 µm, preferably smaller than 50 µm, and the remaining solid matter is collected on the bottom of the granulation chamber 6. This sediment mainly consists of an insoluble precious metal fraction, which can be leached in reactor leaching employing chloride leaching. The granulation chamber 6 is preferably provided with mixing to keep the atomized matte powder in motion.

In sulfuric acid atomization the major part of valuable metals, such as copper, cobalt and nickel, can be leached. Solution and precipitate received from the granulation and sulfuric acid leaching are separated from each other. The filtrate is fed to solution purification and metal extraction and the precipitate is fed to chloride leaching process.

In chloride leaching the precipitate is total leached and precious metals are separated from solution by first leaching gold, palladium and platinum and other metals by simultaneous precipitation or selective leaching.

The new process arrangement dispenses with the need for matte milling. The especially aggressive confrontation between the acid and the melt boosts the performance of the sulfuric acid leaching.

Melt that contains nickel, copper and precious metals can be produced from mixed metal concentrate via smelting process. The feed of the acid granulation process can be, for instance, molten nickel-copper matte from a flash smelter, an Aussmelt furnace or an electric furnace, or melt from a combination of these furnaces. The feed can also be melt from a scrap smelter. Also raw material processed in a Kaldo furnace or a TROF furnace can be atomized by the present process. The nickel and copper contents of the feed can vary. It is worth noticing that the feed contains only small amounts of sulfur and iron. It is the low sulfur content of the matte that promotes dissolution of metals in connection with atomization.

Table 1 shows an example of the composition of feed that can be used in the acid granulation process according to the present invention. In this particular case, the secondary smelter is a TROF furnace. Advantages of TROF include a possibility to oxidize matte to very low sulfur content and controlled tapping of molten matte to a granulation chamber.

TABLE 1

| Ni % | Cu % | Co % | Fe % | S % | PGM + Ag % |
| --- | --- | --- | --- | --- | --- |
| 25 | 46 | 0.4 | 1 | 1 | 0.1 |

To atomize the molten matte, a melt stream falling down from the launder 5 is guided in front of a liquid jet produced by the atomizing nozzle 7 such that a vigorous liquid jet is focused on the molten matte. The pressure of the liquid jet is over 8 MPa and its sulfuric acid content is high, preferably over 20% by weight. It is essential that the acid solution cools through water evaporation and the concentrated acid reacts on the surface of a melt drop or hot matte particle, whereby sulfates and partly also oxides are developed. Oxides thus formed also dissolve into the acid.

Equipment needed for the simultaneous granulation and leaching comprises a granulation chamber 6, a launder 5 for feeding the melt, one or more atomizing nozzles 7 for spraying the acid solution, and a high pressure pump 10 for pumping the acidic solution. The high pressure pump 10 can alternatively be pneumatically operated, because the oxidation of matte during atomization is just beneficial. As a granulation chamber 6 can act a thickener, which is provided with a rake, or a clarifier, which is provided with a discharge screw for discharging the precipitate.

Reference will next be made in detail to two further embodiments of the present invention, referring to FIG. 2.

The first example relates to wet granulation of nickel matte with a solution that contains sulfuric acid and metal sulfates.

Molten nickel matte at a temperature of 1150° C.-1500° C., containing mainly nickel sulfides, metallic nickel and other metallic fractions, such as Au, platinum group metals (PGM) and Cu in the form of metals and metallic compounds, is poured from a ladle 29 to a launder 5, from which it flows as a freely falling stream into a granulation chamber 30. In the granulation chamber 30 the melt stream meets an acid solution jet sprayed from atomizing nozzles 31. The acidic solution contains water, sulfuric acid and possibly metal sulfates. The pressure of the liquid jet is 5-8 MPa. The concentration of free sulfuric acid in the acid solution is 5-15 g/l, and the solution can be close to its saturation point. The concentration of dissolved metal sulfates in the solution can be 0-20 g/l, although sometimes the solution can even be saturated. The mass flow of the liquid jet is about hundred-fold compared to the mass flow of the melt.

Acid solution is circulated from the lower part of the granulation chamber 30 to the atomizing nozzles 31 by means of a high pressure pump 10. Fresh sulfuric acid and water can be added to the acid solution to replace water that has evaporated and acid that has reacted during the process. Acid solution can be circulated both from the granulation chamber 30 and from a separate acid mixing tank. Injection of gas or steam via gas line 32 can also be carried out to boost the granulation. The influence of gas or steam injection can be further improved by injecting solid particles together with the gas or steam.

The feed pressure of the acid solution is preferably adjusted so that the size of matte particles formed if using water granulation instead of acid granulation would be smaller than 50 µm. The pressure and amount of acid solution are adjusted so that dissolution of matte is as efficient as possible and the amount of insoluble matte is kept as low as possible. Control parameters include the pressure and amount (i.e. mass flow) of the acid solution and the content of free acid. Furthermore, it is advantageous to maintain the content of already dissolved metal in the acid solution low.

It should be noted that the above described period only lasts a few seconds so that the reactions in each temperature range do not go to an end. In order to maximize the desired reactions, reaction time can be extended by recycling part of the off-gas exiting the granulation chamber 30 via a gas recirculation line 33 back to the reaction space so that a temperature area of 500° C.-800° C. is maintained in the granulation chamber 30 as long as possible. Reaction time can also be extended by arranging temperature control in the reaction space.

The reaction space within the granulation chamber 30 can be divided into several different temperature areas. In acid granulation at a temperature above 1300° C. reaction between the acid and the melt takes place immediately. At this temperature sulfuric acid and water are decomposed into gaseous components, comprising water in the form of steam and acid in the form of sulfate. Reaction at this temperature takes mainly place between the gas phase and the melt. Localized solidification of molten metal takes place when the melt is struck by the liquid jet, thereby atomizing so that the surface of the matte partly reacts chemically and partly solidifies. In this connection, water is vaporized and the sulfate ion of the sulfuric acid, which can partly be in the form of sulfur dioxide or sulfur trioxide, reacts with the metal, forming various metal sulfate compounds depending on the temperature area.

When the temperature decreases below the melting temperature of the matte, which is in the range of 1300° C.-700° C., reactions are quick and vaporization is intense. In these reactions liquid partly vaporizes, acid partly decomposes, or the concentration of acid on the particle surface increases such that the concentrated acid reacts on the surface of the particle at a high temperature, for instance 700° C.-850° C. The concentrated acid leaches metals and most other compounds at this temperature, and metal sulfate crystals are partly formed. At a temperature above 850° C., sulfuric acid and water are decomposed into gaseous compounds, water being in the form of vapor and acid in the form of sulfate, sulfur trioxide or sulfur dioxide depending on the temperature. Sulfate is not stable at a temperature above 700° C., which is why some decomposition products are discharged together with gases. Due to chemical reactions on the particle surface and the exothermic character of these reactions, the solidifying surface layer, which has reacted, is partly deflocculated, exposing new non-reacted surface ready to react. Part of the non-reacted acid can evaporate or decompose.

Temperature area 850° C.-500° C. is the most significant reaction zone, because sulfuric acid and sulfates are stable in this area and the permanent compounds are formed. At 800° C.-500° C. the formation of sulfates is the quickest and the formed sulfate salts are stable. As stated above, sulfate salts formed on the surface of a metal or matte particle are water-soluble and porous and the specific volume of the particle is larger than the initial particle itself, which is why sulfate is removed from the particle surface and new reactive surface is constantly revealed.

More widely estimated, at a temperature area of 800° C.-200° C. metal sulfates are stable so that formation of sulfate salt can take place. Acid reacts rapidly with the reactive hot surface of metal or metal sulfide forming metal sulfates, and the presence of oxygen or air speeds up the reaction. As the temperature is higher in the center of a particle than on the surface, the particle gives up heat onto the surface when the surface of the particle cools.

At a temperature of 200° C.-100° C. sulfate formation continues and water evaporates from the particle surface. When the temperature drops below 100° C., dissolution of nickel sulfides ceases. Metallic nickel continues to dissolve due to the acid, although slowly. Oxidation is necessary at this temperature because without oxidation there would be a high risk of hydrogen generation. Also at this temperature area sulfates are stable and dissolve in water.

The boiling point of sulfuric acid is 338° C. and nickel sulfate decomposes at 840° C. To promote oxidation, for instance vanadium pentoxide can be used as catalyst.

Figure 2:
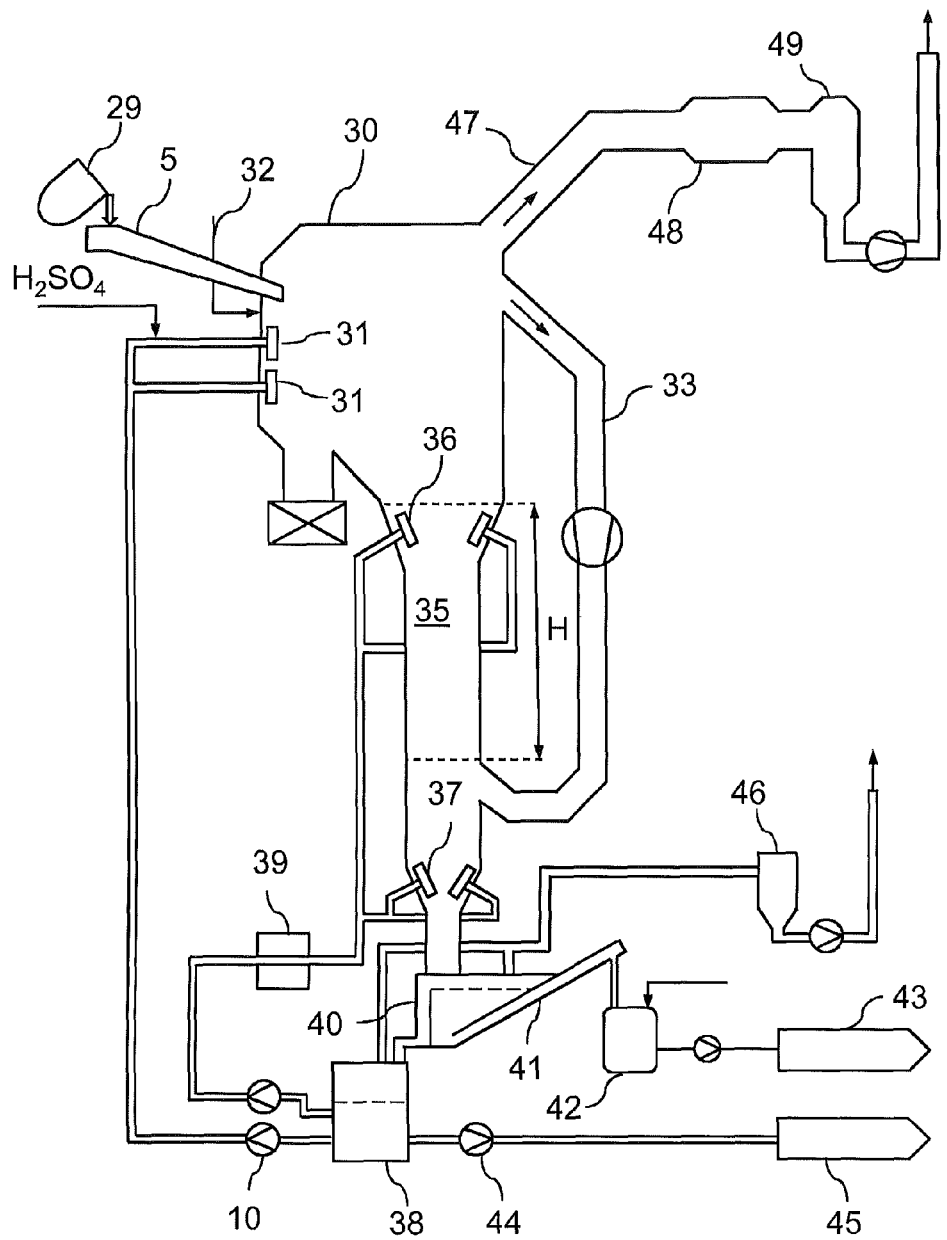
FIG. 2 is a flow sheet of another embodiment of a process according to the present invention.

FIG. 2 shows an example of a granulation apparatus that can be used in wet granulation. Melt at a temperature of about 1400° C. is poured from a ladle to a launder 5. Alternatively, the melt can be tapped directly from a furnace (not shown). Acid jets injected via atomizing nozzles 31 and gas jets introduced via a gas inlet pipe 32 are used to atomize the melt falling from the launder 5 into the granulation chamber 30. The melt particles formed as a result of collision between the jets and the matte are cooled to 500° C.-800° C. and they fall from the upper part of the granulation chamber 30, where the temperature is 1400° C.-800° C., to a reaction shaft 35 in the lower part of the granulation chamber 30, where the reaction between the acid and the granulated matte continue.

The structure and operation of the granulation chamber 30 is designed such that the reactions take place at the optimal temperature area of 800° C.-500° C. as long as possible. This feature is boosted by recycling hot gases from the upper part of the granulation chamber 30 to the reaction shaft 35 via a gas recirculation line 33. Furthermore, aqueous acid can be injected into the reaction shaft 35 via nozzles 36 and into the space below the reaction shaft 35 via nozzles 37 in the form of an aerosol to boost the reaction. The acid solution that is supplied to said nozzles 36 and 37 is taken from a product solution collector 38 and pumped through a heat exchanger 39 to cool the acid to a desired temperature. The length of the reaction space at an optimal temperature area is denoted by H in FIG. 2.

Finally, the granulated and chemically reacted material falls from the reaction shaft 35 to a basin 40 that is filled with acid solution. The basin 40 is provided with a screw conveyor 41 for discharge of solid particles. The basin 40 may also be provided with oxygen or air supply (not shown) in order to avoid the risk of hydrogen generation in the basin 40. The solid deposit from the basin 40 is transferred by the screw conveyor 41 to a deposit tank 42, where the solids are diluted with a suitable solution. After that, insoluble deposit from sulfuric acid leaching is transferred to further treatment 43, which may comprise, for instance, chloride leaching and electrowinning of precious metals from the solution.

Overflow from the basin 40 is fed to the product solution collector 38, from which a part of solution is circulated by the high pressure pump 10 to the atomizing nozzles 31 and via the heat exchanger 39 to the nozzles 36 in the upper part of the reaction shaft 35 and nozzles 37 in the lower part of the reaction shaft 35. The major part of the product solution from the product solution collector 38 is pumped by a product solution pump 44 to further process steps 45, which may comprise, for instance, solution purification and electrowinning of valuable metals.

The process also comprises gas collection equipment for collecting exhaust gases containing water vapor, sulfur dioxide and sulfur trioxide, returning some gases to the process. The gas withdrawn from the process can be scrubbed to meet environmental requirements. Also employing a fabric filter in the gas cleaning cycle is possible. The off-gases from the basin 40 and product solution collector 38 are washed in a scrubber 46.

The process comprises heat recovery from the hot gases discharged from the granulation chamber 30 via a discharge channel 47. The discharged hot gases are conveyed to a boiler 48, where the gases are cooled and, at the same time, water circulating in the boiler 48 is heated, generating either steam or hot water. Flue gas from the boiler 48 is cleaned in a dust separator 49 before it is released to the atmosphere. The dust separator 49 may be, for instance, a filter or a scrubber.

The second example of the present invention relates to dry granulation of matte, for instance nickeliferous matte, with the aid of condensing acid and dry metal sulfate. The method and apparatus resemble those described in connection with FIG. 2, with some exceptions.

Molten nickel matte at a temperature of 1150° C.-1500° C., which matte mainly contains nickel sulfides, metallic nickel and other metallic fractions, such as gold, PGM and copper in the form of metals and metallic compounds, is fed via a launder 5 to a granulation chamber 30. In the granulation chamber 30 the melt flows gravitationally through acid solution jets sprayed from atomizing nozzles 31. The acid solution consists of water, sulfuric acid and metal sulfates. The pressure of the solution jets is preferably 5-8 MPa. The concentration of free sulfuric acid in the solution is 5-50 g/l. The concentration of dissolved metal sulfates can be 0-20 g/l.

The mass flow of the solution jet in relation to the mass flow of the melt is adjusted such that the entire product is dry when ending up in the bottom of the granulation chamber 30, from where the dry product is transported to further processing.

Fresh acid and water are added to the process to replace evaporated components and acid that has reacted. Solution is fed from a washing acid tank (not shown) or directly from an acid mixing tank (not shown).

In the view of processing, it is advantageous to oxidize the matte as far as possible already in the preceding furnace so that more reactive metallic nickel is formed as much as possible. However, the amount of valuable metals going to slag needs to be minimized.

The feed pressure of the granulation solution has been adjusted such that the size of metal particles formed in water granulation/atomization would be smaller than 50 μm. The pressure and amount of the granulation solution are adjusted such that dissolving of nickel matte is as efficient as possible and the amount of insoluble nickel matte is as low as possible. Control parameters are the pressure and amount (mass flow) of the solution and the amount of free acid. It is also advantageous to keep the amount of already dissolved metal low.

In order to maximize the desired reaction conditions, reaction time in optimal conditions can be extended by recycling part of hot gases from the upper part of the granulation chamber 30 via a gas recirculation line 33 to a reaction shaft 35 in the lower part of the granulation chamber 30 such that the temperature area of 500° C.-800° C. can be maintained as long as possible. Reaction time can also be extended by arranging an advantageous temperature control in the reaction area.

The temperature areas and reaction zones within the granulation chamber 30 are mainly similar to those discussed above in connection with wet granulation.

In acid granulation at a temperature above 1300° C. the reaction between the acid and the melt takes place immediately. At this temperature sulfuric acid and water are decomposed into gaseous components, comprising water in the form of steam and acid in the form of sulfate. Reaction takes mainly place between gas phase and melt. Localized solidification of molten metal takes place when melt is struck by liquid jet, thereby atomizing so that the surface of the matte partly reacts chemically and partly solidifies. In this connection, water evaporates and the sulfate ion of the acid, which can partly be in the form of sulfur dioxide or sulfur trioxide, reacts with the metal, forming various metal sulfate compounds depending on the temperature area.

When the temperature decreases below the melting temperature of the matte, which is in the range of 1300° C.-700° C., reactions are quick and evaporation is strong. In these reactions the solution partly vaporizes and the acid partly decomposes or concentrates on the particle surface. The concentrated acid reacts on the particle surface at a high temperature, dissolving metals and most other compounds at this temperature. Sulfate crystals are partly formed. At a temperature above 850° C. sulfuric acid and water decompose into gaseous compounds, water into steam and acid into sulfate, sulfur trioxide or sulfur dioxide, depending on temperature. Sulfate is not stable at a temperature above 700° C., which is why decomposition products are discharged together with gases.

Due to the chemical reaction on the particle surface and its exothermic character, solidified surface layer, which has reacted, is partly deflocculated exposing non-reacted surface for further reactions. Part of non-reacted acid is evaporated or decomposed.

Temperature area of 850° C.-500° C. is the most significant zone for the reactions to take place, because in this area sulfuric acid and metal sulfates are stable and compounds that are formed are permanent. From the point of view of reactions, the most beneficial temperature area is 800° C.-500° C. where the formation of sulfate is quickest and the sulfates are stable. As stated above, sulfate formed on the surface of metal or matte particles is water-soluble and porous and its specific volume is larger than the initial particle itself, which is why sulfate is removed from the particle surface and new reactive surface is constantly exposed.

More widely estimated, at a temperature area of 800° C.-200° C., metal sulfates are stable so that sulfate formation can take place. Acid reacts rapidly with reactive hot metal and metal sulfide surfaces forming metal sulfates, and the presence of oxygen or air speeds up the reaction. As the core of a particle is hotter than its surface, the core transfers heat onto the surface at the same time as the surface cools.

At the temperature area of 200° C.-100° C., sulfate formation continues and water evaporates from the particle surface.

The goal in dry granulation is to optimize the feeding of water and acid so that all acid has reacted and all water has evaporated before the solution ends up into the screw conveyor 41 below the reaction shaft 35. The dry solid matter, which is rich in metal sulfates, can be conveyed from the screw conveyor 41 to a leaching reactor, or it can be dry stored.

In a subsequent leaching process nickel sulfate is leached and the insoluble fraction is guided to further processing. The leaching residue can be separated from the product solution and conveyed to further processing in an autoclave or in chloride leaching. In that case, insoluble nickeliferous mineral is leached, or it is directly guided to precious metal leaching depending on the reaction grade in the granulation process.

The apparatus used in dry granulation differs from the apparatus used in wet granulation (FIG. 2) in that the dry granulation apparatus does not comprise circulation of acid solution and the screw conveyor 41 acts in a dry environment.

Benefits of the present invention are numerous. The method according to the present invention enables sulfate leaching of nickel matte. There is no need for employing pressure leaching. Valuable metals can be processed in sulfate environment, and insoluble precious metals can be recovered in a second leaching step with the help of chlorides. Platinum group metals can be extracted with good yield into a concentrate.

Arranging a smelter process before the matte granulation and leaching step gives good yield of metals and reduces the amount of gangue in the mixed matte close to zero.

The yield of platinum group metals in leaching is improved because the amount of sulfur is so small that it does not interfere with the yield.

The number of devices needed in leaching, extraction and electrowinning is reduced compared to the present process flow sheets.

Clean metals can be recovered by means of extraction.

The new method allows exploitation of the efficiency of chloride extraction and converts electrolytic processes to conventional sulfate electrolysis, which has been used through the ages.

Acid produced in the sulfuric acid plant can be utilized in acid atomization and also dilute acids can be used in the main process. In leaching even dilute sulfuric acids from the sulfuric acid plant can be used.

It is also worth noticing that one particular feature of the new process is the better controllability of sulfur and iron compared to traditional concentrate leaching processes. Thereby significant advantage is gained in the yield of platinum group metals, because platinum and palladium are not bound to sulfur but they go to the solution from which they can be recovered by extraction. Even though a small amount of platinum and palladium would be bound to sulfur, it can be recovered from the leach residue, the amount of which is small and which can be returned for instance to the smelter for new processing.

The embodiments of the invention described hereinbefore may be used in any combination with each other. Several of the embodiments may be combined together to form a further embodiment of the invention. A method, a composition or a use, to which the invention is related, may comprise at least one of the embodiments of the invention described hereinbefore.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for granulating molten matte, comprising the steps of feeding molten matte as a falling stream into a granulation chamber, spraying one or more liquid jets on the stream of molten matte to atomize the matte to form matte particles, and cooling the matte particles thus formed, wherein the liquid jet(s) comprise(s) acid solution containing water and sulfuric acid so that the acid solution starts leaching metals from the matte when the liquid jet contacts the molten matte.

2. A method according to claim 1, wherein a product solution settling on the bottom of the granulation chamber is partly circulated to the liquid jet(s) and partly supplied to further steps of metal recovery.

3. A method according to claim 1, wherein, in addition to said liquid jet(s), one or more jets of gas or steam is/are blown on the falling stream of molten matte to intensify atomization of the matte.

4. A method according to claim 3, wherein solid particles are introduced into said gas or steam jets to intensify an effect of the gas or steam jet(s).

5. A method according to claim 1, wherein hot gases are circulated in the granulation chamber to expand a temperature area suitable for leaching reactions.

6. A method according to claim 1, wherein atomized matte particles are cooled at a lower part of the granulation chamber (30) by spraying a liquid jet of cooled product solution on the matte particles.

7. A method according to claim 1, wherein the acid solution contains 5-50 g/l free sulfuric acid and 0-20 g/l metal sulfates and that a mass flow of the liquid jet(s) in relation to a mass flow of the molten matte is adjusted so that a final product settling on the bottom of the granulation chamber is essentially free of liquid phase.

8. A method according to claim 1, wherein the acid solution contains 5-15 g/l free sulfuric acid and 0-20 g/l metal sulfates, and that the matte particles are separated from a product solution in or after the granulation chamber.

9. A method according to claim 1, wherein the matte particles formed in the acid granulation are passed to further steps of metal recovery by leaching.

10. A method according to claim 1, wherein the molten matte is nickeliferous matte, which also contains at least one metal selected from the group consisting of copper, cobalt, platinum group metals, gold and silver.

11. A method according to claim 1, wherein off-gases generated during granulation and leaching are conveyed to a gas scrubber and an acid recovered by the gas scrubber is returned to the granulation chamber or neutralized.

12. A method according to claim 1, wherein product solution generated during granulation and leaching is pumped to metal recovery carried out by solvent extraction.

13. A method according to claim 1, wherein product solution generated during granulation and leaching is pumped to metal recovery carried out by precipitation.

14. A method according to claim 1, wherein a product solution generated by extraction and separation steps is precipitated by an electrowinning process.

15. A method according to claim 14, wherein at least one chemical selected from the group consisting of $CaCO_3$, NaOH, $H_2S$ NaSH, and $Ca(OH)_2$ is used in the extraction and/or separation steps.

16. An apparatus for granulating molten matte, comprising a granulation chamber, an inlet feeding a stream of molten matte into the granulation chamber, at least one atomizing nozzle for spraying a liquid jet on the stream of molten matte to atomize the matte, wherein the liquid jet comprises an acid solution containing water and sulfuric acid so that the acid solution is able to start leaching metals from the matte as soon as the liquid jet contacts the molten matte and a gas recirculation line that circulates hot gas in the granulation chamber to extend the area of optimal reaction temperature.

17. An apparatus according to claim 16, wherein the apparatus further comprises a discharge channel for conveying off-gas from the granulation chamber or lines from a basin-containing a product solution generated in the granulation chamber to a gas scrubber for removing acid gases from the off-gas and for recycling the acid gases back to the process.

* * * * *